United States Patent [19]

Hammen

[11] Patent Number: 5,763,004
[45] Date of Patent: Jun. 9, 1998

[54] APPLIANCE AND PROCESS FOR INTRODUCING SEALING COMPOUND INTO LUG CAPS

[75] Inventor: Erwin Hammen, Ascheberg, Germany

[73] Assignee: BASF Lacke + Farben, AG, Muenster-Hiltrup, Germany

[21] Appl. No.: 591,633

[22] PCT Filed: Aug. 11, 1994

[86] PCT No.: PCT/EP94/02678

§ 371 Date: Mar. 22, 1996

§ 102(e) Date: Mar. 22, 1996

[87] PCT Pub. No.: WO95/07174

PCT Pub. Date: Mar. 16, 1995

[30] Foreign Application Priority Data

Sep. 4, 1993 [DE] Germany ............ 43 29 948.2

[51] Int. Cl.$^6$ ............... B05D 7/22; B05D 3/12; B05D 1/02; B05L 5/00
[52] U.S. Cl. .............. 427/231; 427/230; 427/233; 427/234; 427/236; 427/240; 427/424; 427/425; 118/52; 118/55; 118/313; 118/317; 118/318; 118/319; 118/320; 118/321
[58] Field of Search ................ 427/231, 234, 427/424, 425, 233, 236, 240, 230; 118/314, 315, 316, 317, 318, 319, 320, 313, 52, 55

[56] References Cited

U.S. PATENT DOCUMENTS

| | | | |
|---|---|---|---|
| 3,053,221 | 9/1962 | Heffley et al. | 118/318 |
| 3,376,848 | 4/1968 | Relyea et al. | 118/320 |
| 3,788,561 | 1/1974 | Vilagi et al. | |
| 4,007,704 | 2/1977 | Haviland | 118/6 |
| 4,051,805 | 10/1977 | Waldrum | 118/58 |
| 4,056,644 | 11/1977 | Howard et al. | 472/284 |
| 4,204,641 | 5/1980 | Rouse et al. | 239/121 |
| 4,382,422 | 5/1983 | Eddy et al. | 118/669 |
| 4,592,690 | 6/1986 | Busch . | |
| 5,215,587 | 6/1993 | McConnellogue et al. . | |

FOREIGN PATENT DOCUMENTS 0012314  3/1978  European Pat. Off. .

*Primary Examiner*—Shrive Beck
*Assistant Examiner*—Michael Barr

[57] ABSTRACT

Also disclosed is an appliance for introducing sealing compound into lug caps, the appliance containing a turntable for accommodating the cap, and an injection unit, the injection unit containing a nozzle block, which has annularly arranged injection nozzles, and a delivery device for the sealing compound, the turntable and the nozzle block being arranged so as to be centered and the nozzle block being rotatable in the same direction as the turntable.

The invention also relates to a process for introducing sealing compound into lug caps and to the use of the appliance for injecting sealing compound into lug caps.

13 Claims, 1 Drawing Sheet

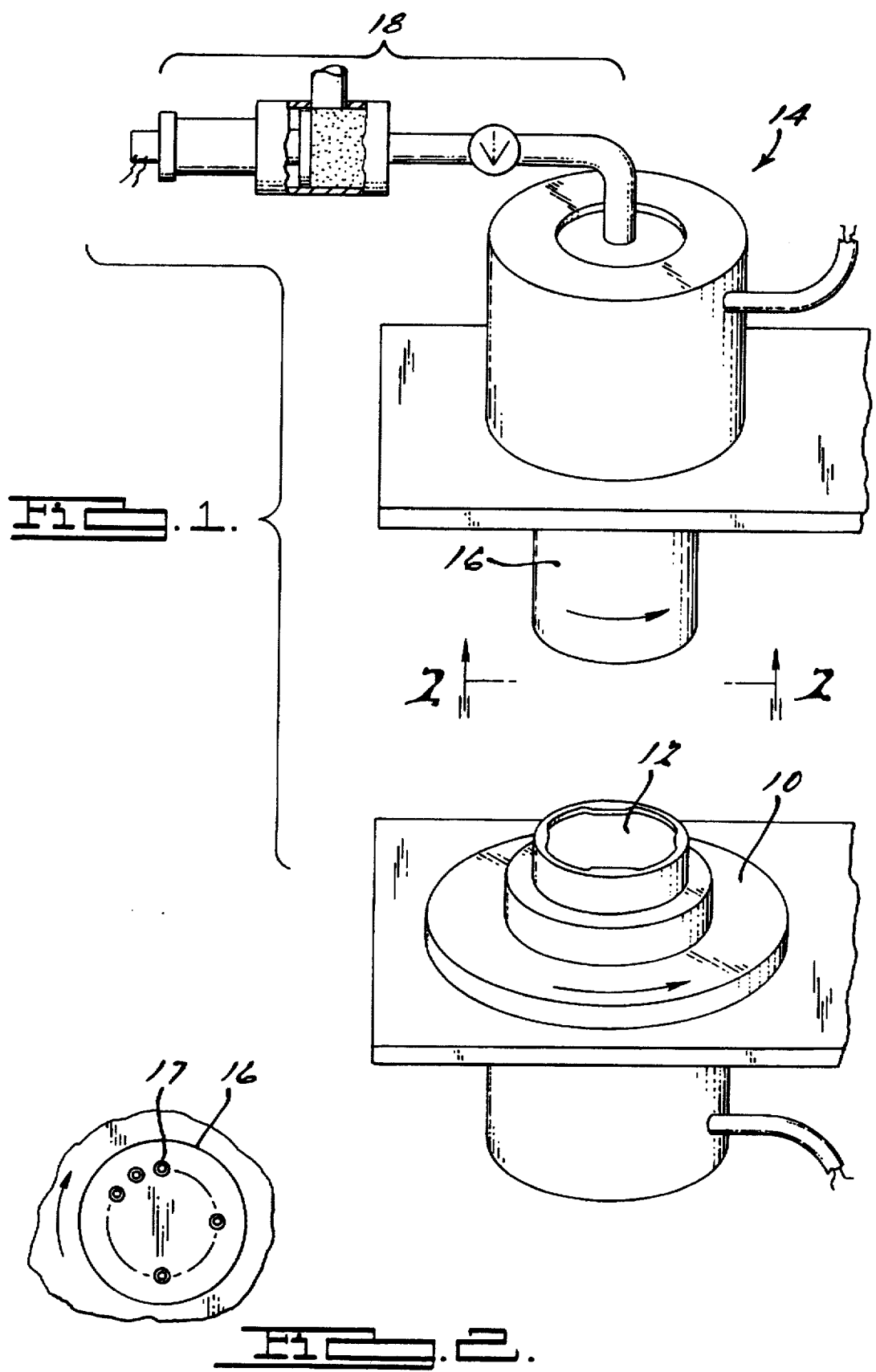

APPLIANCE AND PROCESS FOR INTRODUCING SEALING COMPOUND INTO LUG CAPS

FIELD OF THE INVENTION

The present invention relates to an appliance for introducing sealing compound into lug caps. The invention further relates to a process for introducing sealing compound into lug caps and to the use of the appliance for injecting sealing compound into lug caps.

BACKGROUND AND SUMMARY OF THE INVENTION

Lug caps are used to close packages such as jars and glass preserves. The purpose of the various packaging materials is hermetic sealing of the contents against the environmental effects, even under extreme conditions as exist, e.g., in the heat sterilization of foodstuffs. In order to ensure this insulation of the contents from the environment, lids and caps with which the package is closed have suitable sealing compounds introduced thereinto. Commercially, i.e. economically satisfactory sealing compounds for closures must have a number of critical properties which make them into highly specialized materials and compositions. Furthermore, the properties required of the sealing compounds are also, inter alia, determined by the intended use of the packagings.

In the case of packaging for foodstuffs, particular significance attaches to the stability of the sealing compounds with respect to the contents during sterilization or pasteurization, respectively, and during the storage, often for years, of the packed foodstuffs. Normally, use is made, for caps and lids of packages made of metal, of sealing compounds made of plasticizer-containing PVC plastisols as described, in the case of caps for jars, for example in DE B-20 03 693. In addition to said PVC sealing compounds, sealing compounds based on polyurethane are also known, however.

Sealing compounds can be applied in injection machines to the inside of the closures. In so doing, the problem arises on the production scale that the introduction of the sealing compound can not always be carried out in a defect-free manner, i.e. not always seamlessly. Also, high spinning speeds are often necessary on injection machines in order to correct any defects formed. The high spinning speeds are intended to subsequently ensure a uniform distribution of the injected sealing compound. Furthermore, complicated electronic control mechanisms are required for correcting the seams.

Moreover, it is difficult on the laboratory scale to manufacture, for testing purposes, lug caps provided with sealing compounds. There is, however, the requirement of manufacturing, for testing purposes, internally coated lug caps provided with polymer compounds, in order to test the efficacy of newly developed sealing compounds and, in particular, the efficacy of the sealing compounds on various inner coatings of the caps. Thus there is a need for a simple, cost-effective appliance for introducing sealing compounds to the previously coated inside of lug caps or to coated circular blanks having a sealing-compound sprue, which are inserted into neutral closures.

The object of the present invention therefore is to provide an appliance for introducing sealing compounds into lug caps made of metal for test purposes, i.e. at the laboratory scale. At the same time, the appliance should be as cost-effective and practical as possible, function in a simple manner and insert the sealing ring with high accuracy. It should be possible, by providing said appliance, to dispense with the otherwise required occupation of production lines. By means of the appliance to be newly developed, it should be possible to carry out in a rapid and simple manner sterilization tests or the testing of the caps on the preserve jars, using a very wide variety of sealing compounds and a very wide variety of coating systems for the inner coating of the caps. Introduction of the sealing compound is to take place uniformly with accurate compound coverage and without discernable seams. The appliance, to be operated on a laboratory scale, should be able to dispense with high spinning speeds which have hitherto been in general usage in injection machines for sealing compounds in order to correct defects. Moreover, no complicated electronic control mechanisms for correcting the seams should be required.

The object of the present invention is achieved, surprisingly, by an appliance for introducing sealing compound into lug caps, which is characterized in that the appliance contains a turntable for accommodating the cap, and an injection unit, the injection unit containing a nozzle block, which has annularly arranged injection nozzles, and a delivery device for the sealing compound, the turntable and the nozzle block being arranged so as to be centered and the nozzle block being rotatable in the same direction as the turntable.

BRIEF DESCRIPTION OF THE DRAWINGS

FIG. 1 is a diagrammatic perspective view of an apparatus for introducing sealing compound into lug caps according to the invention.

FIG. 2 is a view taken along section line 2—2 of FIG. 1.

DETAILED DESCRIPTION

Referring now to the figures in the 10 turntable of the appliance according to the invention, precoated lug caps 12 or neutral closures with a precoated stamped-out circular blank made of tin plate or aluminum are inserted and secured. In order to produce the circular blanks, plate body blanks, e.g. in DIN A 4 Format, are provided, on a laboratory scale, on a laboratory coating machine or with the aid of a doctor rod, with an inner coating which usually consists of a primer and an adhesive coating. Suitable materials for the inner coating of the lug caps are coatings conventionally used in the packaging industry, based on epoxy-phenol resin, acrylate resin, polyester or organosols. These coatings are known (cf. e.g. H. Kittel, Lehrbuch der Lacke und Beschichtungen [Textbook of Paint and Coatings], Volume IV, Lack- und Beschichtungssysteme, Formulierung, [Paint and coating systems, formulation], Pub. W. A. Colomb. within H. Heenemann GmbH, Berlin-Oberschwandorf 1976) and therefore need not be described in detail.

Then circular blanks are stamped out, for example on an Erichsen blanking machine or in a cutting die in a toggle press, which blanks may, e.g., have a diameter of 64 mm for Standard 63 lug caps. Within the stamped-out circular blanks, a sealing-compound sprue is accurately formed separately in the embossing die, for example by means of spring cushion and clamping ring. This can likewise be done in a toggle press. In the case of the appliance according to the invention, the stamped-out circular blanks provided with the inner coating are inserted and secured in the lid and are inserted into the turntable.

Alternatively it is of course possible to insert finished lug caps provided with an inner coating into the turntable of the appliance according to the invention.

The turntable and the nozzle block may be driven in any way required. Preferably, they are driven by separate, continuously controllable electric motors.

The injection unit 14 of the appliance according to the invention contains a nozzle block 16 with annularly arranged injection nozzles 17. Preferably, the application appliance contains from 14 to 22 annularly arranged injection nozzles, for a mean cap diameter of from 53 to 77 mm. Preferably, the spacing between the annularly arranged injection nozzles is from 8 to 14 mm. Of course, larger or smaller spacings are also possible. If the spacings are larger, the nozzle block should be rotated in the same direction, so as to lead or follow the turntable, whereas in the case of smaller spacings between the injection nozzles, the nozzle block should be rotated in the same direction and synchronously with the turntable. The radius of the circle formed by the injection nozzles must of course match the lid size. The size of the circle formed by the injection nozzles must be designed in such a way that the sealing compound, during injection, reaches the shaped sealing-compound sprue. Preferably, the sealing compound, during injection, reaches the center of the sealing-compound sprue. It is therefore preferable for the injection nozzle arrangement to be replaceable and thus to be adjustable to the lid size in each particular case.

Preferably, the injection nozzles are arranged in such a way that the sealing compound arrives vertically downwards on the inside of the lid. Of course, alternatively the injection nozzles can be arranged in such a way that the angle between the lid plane and the injected compound extrudate is not 90° C. The angle can be chosen variably, in order to ensure that different lid sizes are matched.

Of course, the injection unit can be equipped with a controllable heating system in order to be able to bring the sealing compound and the injection head to a suitable temperature.

By means of a different rotational-speed setting at the nozzle block and at the turntable, the injection angle of the sealing-compound extrudate with respect to the lid plane is varied. The optimum injection angle results from the flow behavior of the sealing compound.

The injection unit of the appliance according to the invention may contain any delivery devices 18 desired for conveying the sealing compound to the injection nozzles. Thus, conveying the sealing compound may, for example, be effected under computer control. Preferably, the injection unit contains a cylinder for holding the sealing compound, and a piston which forces the sealing compound from the cylinder into the nozzle block and into the injection nozzles arranged thereon, respectively.

Opening and closing the injection nozzles can be effected in any way desired, e.g. by computer-controlled injector needles or via a closure ring which is situated on the nozzle block. When low-viscosity sealing compounds are processed it is possible, in addition, to employ a set of injector needles for closing the injection nozzles automatically.

The nozzle block is driven in the same direction as the turntable, with the option of adjusting the speed with respect to the turntable so as to lead or follow or run synchronously. In this context it is particularly preferable for the turntable and the nozzle block to be able to be driven at a variable rotational speed.

The co-rotation of the lid in the turntable and the injection nozzles in the nozzle block ensures uniform injection of the sealing compound. In this arrangement, the appliance according to the invention has the advantage that high spinning speeds can be dispensed with. Because there is no transition at the seams, the accumulation and deficiency of sealing compound at the critical points are prevented.

The present invention further relates to a process for introducing sealing compound into lug caps, which is characterized in that stamped-out circular blanks provided with an inner coating are shaped, for the sealing compound application, and inserted into neutral caps and these are inserted into a turntable, or lug caps provided with an inner coating are inserted in a turntable, by means of a delivery device the sealing compound arrives in a nozzle block having annularly arranged injection nozzles, and the sealing compound, with the turntable and the nozzle block rotating in the same direction, is applied to the stamped-out circular blanks or into the lug caps, respectively.

Preference is given to a process according to the invention, in which the sealing compound is applied to the circular blanks or to the lug caps, respectively, by means of from 14 to 22 annularly arranged injection nozzles for a mean cap diameter of from 53 to 77 mm. Preferably, the spacing between the annularly arranged injection nozzles is from 8 to 14 mm. Preferably, the application of the sealing compound takes place at a rotational speed of turntable and nozzle block between 20 and 50 rpm. The co-rotation of the lid in the turntable and the injection nozzles in the nozzle head ensures extraordinarily uniform injection of the sealing compound.

According to the process of the invention, the turntable and the nozzle block can be driven in any way desired. Preferably, they are driven by separate, continuously controllable electric motors.

The delivery device for the sealing compound can be chosen at will. Thus, conveying the sealing compound may, for example, be effected under computer control. A process is preferred in which a piston forces the sealing compound contained in a cylinder into the nozzle block having the annularly arranged injection nozzles.

According to the process of the invention, the operation of opening and closing the injection nozzles can be effected in any way desired. Preferably, a closure ring at the nozzle block is opened and, to terminate the sealing compound application, is closed again. When low-viscosity sealing compounds are processed it is possible to employ, in addition, a set of injector needles for automatic closure of the injection nozzles.

Preferably, the turntable and the nozzle block can be driven at a variable rotational speed. By means of a different rotational-speed setting at the nozzle block and at the turntable, the injection angle of the compound extrudate with respect to the lid plane is varied. The optimum injection angle in the process according to the invention depends on the flow behavior of the sealing compound.

The sealing compounds applied according to the process according to the invention are as a rule fused at approximately 220° C. and approximately 60 sec.

The invention likewise relates to the use of the above-described appliance for injecting sealing compound into lug caps or into stamped-out circular blanks for neutral caps. In this context, the lug caps can be internally coated with a wide variety of coatings.

WORKING EXAMPLE:

A lug cap ($\phi$ 63 mm), internally coated with an epoxyphenol resin-based primer and with an organosol-based adhesive coating is inserted into the turntable. The number of the annularly arranged injection nozzles in the injection unit is 18. The injection unit contains a cylinder, provided for holding the sealing compound, and a piston as a delivery device for the sealing compound. The compound composition introduced into the cylinder is a PVC-based sealing compound. The sealing compound is preheated to 38° C. by means of a heating device. The nozzle block and the turntable are driven in the same direction, at a rotational speed of 20 rpm by means of separate, continuously controllable electric motors. The closure ring at the nozzle block is opened, and the piston pressure on the compound composition is set to 0.5 bar. After 1 sec. the closure ring is closed again. The applied sealing compound is then dried for 60 sec at 220° C. The layer thickness of the compound composition is 1 mm. After 24 h, a sterilization test is carried out.

To this end, a test solution (conc. acetic acid and edible oil 1:1) are introduced into a container sealed by the lug cap, and the sterilization test is carried out under the conditions 121° C./1 h. The back pressure on the cap is 2 bar.

Result: the vacuum has been maintained. The adhesion of the sealing compound to the adhesive coating is adjudged to be very good. The sealing compound has not been cut.

What is claimed is:

1. An apparatus for introducing sealing compound into lug caps comprising a turntable for accommodating a lug cap and an injection unit, the injection unit containing a nozzle block having annularly arranged injection nozzles extending in the direction of the turntable for delivering sealing compound into the lug cap and a delivery device for delivering the sealing compound to the nozzle block, the turntable and the nozzle block being arranged so as to be centered with respect to each other and the nozzle block being rotatable in the same direction as the turntable; wherein the turntable and the nozzle block are driven by separate, continuously controllable electric motors.

2. An apparatus according to claim 1, wherein the nozzle block contains from 14 to 22 annularly arranged injection nozzles, for a mean cap diameter of from 53 to 77 mm.

3. An apparatus according to claim 1 wherein the spacing between the annularly arranged injection nozzles is from 8 to 14 mm.

4. An apparatus according to claim 1 wherein the turntable and the nozzle block can be driven at a variable rotational speed.

5. An apparatus according to claim 1 wherein the injection unit comprises a cylinder for holding a sealing compound, and a piston as a delivery device for the sealing compound.

6. An apparatus according to claim 1 wherein there is situated, at the nozzle block, a closure ring for opening and closing the injection nozzles.

7. Process for introducing sealing compound into lug caps, comprising (i) inserting into a turntable a lug cap provided with an inner coating or circular blanks having an inner coating and inserted into a neutral cap, (ii) delivering the sealing compound by means of a delivery device, to a nozzle black having annularly arranged injection nozzles, the turntable and the nozzle block rotating in the same direction, and (iii) applying the sealing compound to the circular blank or into the lug cap, wherein the turntable and the nozzle block are driven by separate, continuously controllable electric motors.

8. Process according to claim 7, wherein the sealing compound is applied to the circular blank or to the lug cap, by means of from 14 to 22 annularly arranged injection nozzles for a mean cap diameter of from 53 to 77 mm.

9. Process according to claim 7 wherein the spacing between the annularly arranged injection nozzles is from 8 to 14 mm.

10. Process according to claim 7 wherein the application of the sealing compound takes place at a rotational speed of turntable and nozzle block between 20 and 50 rpm.

11. Process according to claim 7 wherein the turntable and the nozzle block are driven at a variable rotational speed.

12. Process according to claim 7 wherein a piston forces the sealing compound contained in a cylinder into the nozzle block having the annularly arranged injection nozzles.

13. Process according to claim 7 wherein a closure ring situated at the injection unit is opened to allow application of the sealing compound and, is closed to terminate the sealing compound application.

* * * * *